UNITED STATES PATENT OFFICE.

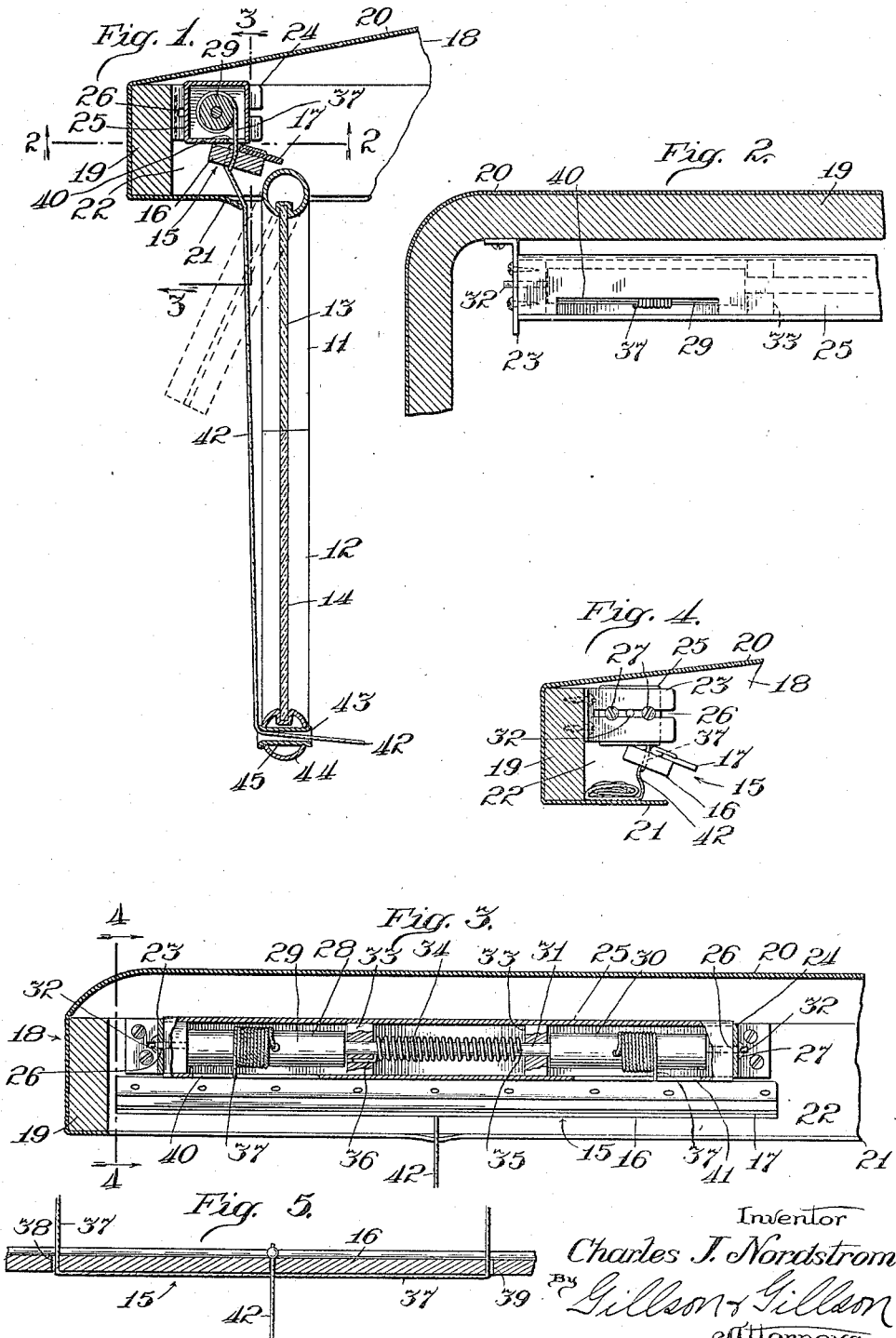

CHARLES J. NORDSTROM, OF EVANSTON, ILLINOIS.

WINDOW-CLEANER.

1,282,620.  Specification of Letters Patent.  Patented Oct. 22, 1918.

Application filed February 5, 1917. Serial No. 146,820.

*To all whom it may concern:*

Be it known that I, CHARLES J. NORDSTROM, a citizen of the United States, and resident of Evanston, county of Cook, and State of Illinois, have invented certain new and useful Improvements in Window-Cleaners, of which the following is a specification, and which are illustrated in the accompanying drawings, forming a part thereof.

The invention relates to window cleaners and has for its principal object to provide a device which is adapted for frequent use to remove accumulations of moisture and the like from windows through which a clear vision is required at all times. Further objects of the invention are to provide a device which is substantially concealed from view when not in use and which is so conveniently operated that it may be used without materially diverting the attention of the operator from other work, as the driving of an automobile. To this end the invention contemplates a squeegee having flexible supports which are wound upon a spring roller.

The invention is exemplified in the structure to be hereinafter described and which is illustrated in the accompanying drawings, wherein—

Figure 1 is a sectional view illustrating one form of the improved cleaner when mounted for movement over the outer surface of an automobile wind-shield, the wind-shield and details of the automobile top being also shown, and a different position of some of the parts being shown by dotted lines, Figs. 2 and 3 are detail sectional views taken on the lines 2—2 and 3—3 respectively of Fig. 1, Fig. 4 is a sectional view taken on the line 4—4 of Fig. 3 but shows the operating cord in a different position, and Fig. 5 is a detail longitudinal sectional view taken centrally through the cleaning implement.

While the device provided by the invention may be used for removing accumulations of moisture and the like from the outer surface of any window, it is particularly useful in connection with automobile wind-shields. The drawings show a familiar type of automobile wind-shield comprising upper and lower sections 11, 12, each having a swinging glass panel, as 13 and 14. The improved cleaner comprises a squeegee generally designated 15. This squeegee is illustrated as comprising the usual rigid body strip 16 and a yielding marginal strip 17 of rubber or like material. As the use of the cleaner will only be required in stormy weather the cleaner may be associated with the automobile top, as 18. This provides against the necessity of permanently associating any part of the cleaner with the wind-shield while still insuring that the squeegee 15 may be supported in position for movement over the outer surface of the glass panels 13—14 whenever its use is required.

As usually constructed the frame of the automobile top 18 will comprise a front cross piece 19 which extends some distance in front of the upper edge of the wind-shield when the top is raised. The covering material, as 20, of the top 18, on the other hand, extends about the front cross piece 19 of the frame and rearwardly from its lower edge, forming a flexible flap 21 having its free edge adjacent the upper edge of the wind-shield. A substantially concealed pocket 22 is thus provided above and in front of the upper edge of the wind-shield. As the front cross piece 19 of the frame of the top 18 constitutes the front wall of the pocket 22 this cross piece serves as a convenient support to which the improved cleaner may be attached. When mounted upon this support the parts of the cleaner may be all contained in the pocket 22, when the cleaner is not in the service.

In the construction shown a pair of brackets, 23 and 24, are adjustably secured against the inner surface of the front cross piece 19 of the frame of the automobile top. When this arrangement is employed a casing 25 is held between the brackets 23 and 24 and each of the said brackets is horizontally slotted, as at 26, (Fig. 4) to permit the adjustment of the casing with respect to the plane of the glass panels 13—14 of the wind-shield. As shown, a pair of clamp screws 27 are applied to each end of the casing 25 through the slot 26 of the corresponding bracket 23 or 24.

The casing 25 serves for inclosing a spring roller generally designated 28. This spring roller is conveniently formed to comprise a pair of winding drums 29 and 30, one at each end, and an intermediate connecting spindle 31. When so formed, each of the drums, 29—30, is preferably provided with a gudgeon 32 upon its outer end and this gudgeon is journaled in the corresponding end wall of the casing 25. While the gudgeons 32 serve as journals for supporting the roller 28 at its ends, additional supports are desirably provided intermediate the ends of the roller. As shown, a pair of partition blocks 33 are mounted within the chamber of the casing 25 and the connecting spindle 31 is extended through and journaled in both of these partition blocks. The actuating spring, as 34, is conveniently coiled about the spindle 31 between the two partition blocks 33. Under these circumstances one end of the spring 34 is fixed in the spindle 31, as at 35, while the other end of the spring is fixed in the adjacent partition block 33, as at 36.

The squeegee 15 is normally held in raised position against the underside of the casing 25, as in Figs. 1, 3 and 4. For this purpose the squeegee 15 is preferably hung in a cord 37 and the two ends of the cord are passed through openings 40—41 in the floor of the casing 25 and wound upon the drums 29—30. As shown, the body strip 16 of the squeegee is formed with openings 38 and 39 through which the cord 37 is passed, an intermediate part of the cord being extended under the squeegee between the said opening. The operation of the cleaner is accomplished by the use of a pull-cord 42 which extends from the mid-length of the squeegee 15.

In order that the view through the panels, as 13, 14, of the wind-shield should not be obstructed in any way when the use of the cleaner is not likely to be required it is preferred that the full length of the pull-cord 42 should normally be contained within the pocket 22, as in Fig. 4. Whenever the use of the cleaner is likely to be required the operator may drop the pull-cord 42 in front of the wind-shield. By tilting the upper panel 13 outwardly, to the position indicated by dotted lines in Fig. 1, he can then thread the end of the cord through an opening 43 in the bottom frame member, as 44, of the wind-shield. As the free end of the cord will now be conveniently accessible, the operator may pull upon the cord whenever the glass panels, as 13, 14, become clouded. Such a pull upon the cord serves to draw the marginal strip 17 of the squeegee downwardly over the outer face of the said glass panels. Upon releasing the cord the spring roller serves to wind up the ends of the cord 37 to draw the marginal strip 17 of the squeegee upwardly over the outer face of the said glass panels. This movement, of course, returns the squeegee to its concealed position within the pocket. If the point of attachment of the pull-cord 42 with the squeegee 15 is located in front of the plane of the opening 38, 39 provided for receiving the cord 37, the squeegee will be tilted in use to more effectively present the marginal strip 17 to the surface of the glass. Furthermore, the slotted openings 26 in the brackets 23 and 24 permit of a suitable adjustment of the casing 25 to insure that the marginal strip 17 of the squeegee shall make contact with the glass surface.

As the cord 37 is free to slide in the openings 38, 39 and against the underside of the body strip 16 between the said openings, the squeegee 15 may become tilted in use, if the accumulations upon the glass surface are such as to afford an ununiform resistance to the movement of the squeegee throughout its length. Should this tilting occur, the squeegee will be immediately returned to a direct horizontal position when it is brought against the underside of the casing 25 by the winding of the ends of the cord 37 upon the drums 29 and 30. To prevent wear upon the cord 42 by repeated movements through the opening 43, a metal tube 45 having rounded ends is preferably fitted in the said opening. It will be understood that the opening 43 should be located directly below the point of connection of the pull-cord 42 with the body strip 16 of the squeegee.

The construction provides a window cleaner which may be completely concealed from view when not in use. Furthermore, the operation of the improved cleaner is so conveniently accomplished that the cleaner may be used as often as may be necessary to maintain a clear view in front of the operator, without interfering with other work which the operator may be required to do. While the drawings illustrate the use of the improved cleaner in connection with an automobile wind-shield it will be understood that it may be used with equal advantage upon locomotive cab and street car windows, the windows of pilot houses for boats and launches, the windows of railroad switch towers and, in fact, upon any windows where a clear vision is desired at all times.

I claim as my invention:

In a widow cleaner, the combination of a casing, a spring roller journaled therein, a squeegee body having a pair of openings through the same near its ends, a cord slidingly threaded through the said openings in the squeegee body and having each of its ends wound upon the spring roller, said squeegee body being adapted to return and engage the casing when released after an operation and caused to assume its normal horizontal position should it become tilted, and means attached to the squeegee body for operating the same.

CHARLES J. NORDSTROM.